$S = f(E, F1, F2, F3)$

INVENTOR.
GUNNAR FANT
BY Hane and Nydick
ATTORNEYS

April 2, 1968 G. FANT 3,376,386
CIRCUIT ARRANGEMENT FOR VARYING THE BAND WIDTH OF A FILTER
IN DEPENDENCE OF THE VOICE FUNDAMENTAL FREQUENCY
Filed April 27, 1964 4 Sheets-Sheet 2

INVENTOR.
GUNNAR FANT
BY Hane and Nydick
ATTORNEYS

April 2, 1968 G. FANT 3,376,386

CIRCUIT ARRANGEMENT FOR VARYING THE BAND WIDTH OF A FILTER IN DEPENDENCE OF THE VOICE FUNDAMENTAL FREQUENCY

Filed April 27, 1964 4 Sheets-Sheet 3

INVENTOR.
GUNNAR FANT
BY Hane and Nydick
ATTORNEYS

INVENTOR.
GUNNAR FANT
BY Howe and Nydick
ATTORNEYS

United States Patent Office 3,376,386

Patented Apr. 2, 1968

3,376,386

CIRCUIT ARRANGEMENT FOR VARYING THE BAND WIDTH OF A FILTER IN DEPENDENCE OF THE VOICE FUNDAMENTAL FREQUENCY

Gunnar Fant, Skirnervagen 1, Djursholm, Sweden

Filed Apr. 27, 1964, Ser. No. 362,772

Claims priority, application Sweden, May 8, 1963, 5,026/63

5 Claims. (Cl. 179—1)

ABSTRACT OF THE DISCLOSURE

An apparatus for emphasizing or bringing into strong relief the significant points or so-called formants in the envelope of the speech spectrum is used in the spectrum analysis of speech signals. The apparatus comprises a plurality of parallel channels connected between a common speech signal input and a common output. Each channel includes a band pass filter, a signal rectifier and a low pass filter serially connected between the input and output in that order. Each of the band pass filters includes a signal energy storing device such as a reactive element. Associated with each channel is a pulse operated switch which is used to discharge speech energy stored by its band pass filter. A pulse generator, connected to each switch, is controlled by the frequency of the voice fundamental signals to emit control pulses having durations which are short with respect to the voice fundamental period. The control pulses cause the switches to discharge the energy stored in the band pass filters during the preceding voice fundamental period.

Figure 1:
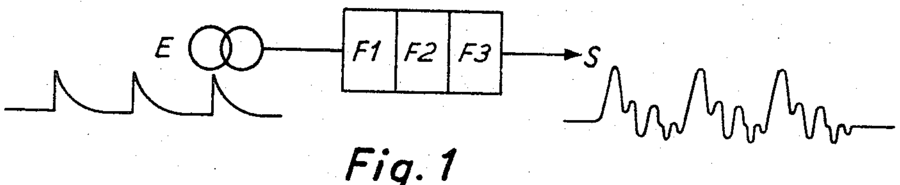

This invention relates to an arrangement for the spectrum analysis of speech signals by means of band pass filters which bring into strong relief the formants of a speech sound spectrum.

As is known voice speech sounds are produced by the periodic opening and closing of the vocal cord which generates a voice fundamental and a plurality of harmonics of this voice fundamental. The voice fundamental and the harmonics pass through a number of successive cavities in the mouth, nose and throat. These cavities amplify those harmonics which are located near to the resonance frequencies of the system. A period of the voice fundamental thus contains a number of sinusoidal attenuated oscillations—one for each natural frequency of the cavity system of the organs of speech. The resulting signal has a periodicity corresponding to the voice fundamental, with a marked amplitude peak at the beginning of each voice fundamental period (see Fant, Acoustic Analysis and Synthesis of Speech With Application to Swedish, Ericsson Technics, Number 1, 1959).

In the spectrum, maximum values which are called formants correspond to the natural frequencies. If, however, a spectrum is represented by a Fourier series, i.e. by a fundamental frequency and harmonics, there will be no even relation between the voice fundamental frequency and the formant frequencies, and therefore the position of a formant does not necessarily correspond to a definite harmonic. In spectrographical studies it is endeavoured to find by interpolation an approximate value for the average frequency of a formant on the basis of the amplitude values of the harmonics within the respective part of the spectrum. This however is not always possible.

In speech the frequency of the voice fundamental varies between 60–200 Hz. for a male voice and one octave higher for a light female voice. The position of the first formant varies between 150–900 Hz. and is approximately 20% higher for a light female voice. The average distance between two successive formants in the spectrum is about 1000 Hz. for a male voice and 1200 Hz. for a female voice and two formants may come as close to each other as 250 Hz. In the case of a high voice fundamental frequency a Fourier series therefore gives a very incomplete image of the formant structure.

Spectrum analysis by means of band pass filters can be carried out either by using a number of devices consisting of band pass filters, rectifiers and smoothing networks. In these devices the band pass filter covers part of the spectrum in question so that a series of intensity values is obtained within subsequent frequency bands. The spectrum analysis can also be carried out by a transportation method in which one single filter shifts its relative position within the spectrum each time the process is repeated.

In most of the applications of spectrum analysis for the study of speech, for automatized analysis of speech in vocoder system, or in speech identifying systems it is desired to read the formant structure in such a way that the frequency position of the formants can be determined with certainty. The choice of suitable band widths for the band pass filters accordingly becomes a problem. If the band width of the filters is made narrower than the voice fundamental frequency, only the filters having a frequency located near to a harmonic will give an output voltage. Therefore the detailed structure of the distribution of energy measured up within the spectrum will be impressed with the harmonic structure and the analysis will approach to a Fourier series.

The optimum band width of the band pass filters of the analyzer is of the order of magnitude of twice the voice fundamental frequency, $2F_0$. If the band widths have been dimensioned with respect to male voices, the analyzer will give a voice fundamental frequency analysis instead of formant analysis of female voices. Conversely, if the dimensioning has been chosen for female voices, the harmonic structure will certainly be avoided completely but the selectivity in the formant frequency determination will be unnecessarily bad for male voices since there is a risk that two adjacent formants will not be distinguished. In consideration of the smaller voice fundamental frequency intervals in the spectrum of a male voice, a fault in the formant determination will be more apparent for a male voice than for a female voice.

The difficulty of furnishing a formant follower with good analysis qualities over a larger range of the frequency $F_0$ of the voice fundamental is the most essential reason why vocoder systems and systems for automatic speech analysis have worked unsatisfactorily for female voices. These difficulties have been so obvious that the designers generally have not extended their effects further than to the goal that their system shall work for the lower part of the voice fundamental range of male voices.

The framing of the problem is most often represented by the conflict between a male voice and a famale voice but it is also conflict between the higher and the lower extreme range of voice fundamental frequency in the speech of one single person, which, as has been indicated can vary over serval octaves.

An object of this invention is to eliminate as far as possible these difficulties so that the harmonic structure will be sufficiently suppressed independently of the frequency of the voice fundamental at the same time as the selectivity becomes satisfactory for analysis of the formant pattern of female voices and increases inversely proportionally to the voice fundamental frequency, so that a very good sharpness of analysis is obtained with the same equipment at low voice fundamental frequencies.

This object is obtained according to the invention in such a way that each band pass filter in a circuit arrangement is provided with a switch connected in such a manner that it discharges the filter upon its closing. The circuit arrangement including a pulse generator controlled by the frequency of the voice fundamental in the speech spectrum in such a manner that, at the beginning of each voice fundamental frequency period, it produces a pulse which controls the switches so that the latter discharge the energy stored in the band pass filters during the preceding voice fundamental period.

The effective band width will in this manner be adapted to the voice fundamental frequency and obtains the same order of magnitude as the latter, which implies a great improvement.

Other objects, features and advantages of the invention will be apparent from the following detailed description, when read with the accompanying drawing which shows by way of example the now preferred embodiment of the invention.

In the drawing:

FIG. 1 shows diagrammatically the time process of the sound pulses generated by the vocal cords, and their transformation after passing through the resonator system of the organs of speech. FIGS. 2*a–e* are diagrams which show diagrammatically how the first three formants are formed and superposed, FIG. 3 shows a sound spectrum with an envelope, FIGS. 4*a–c* show the result of the frequency analysis of the sound by means of filters, the band width of which is smaller than the voice fundamental frequency or is greater than the voice fundamental frequency or is considerably greater than the voice fundamental frequency, FIG. 5 shows a circuit arrangement according to the invention, having three filters, FIGS. 6 and 7 illustrate the fundamental principle of the invention.

Figures 2A, 2B, 2C, 2D, 2E:
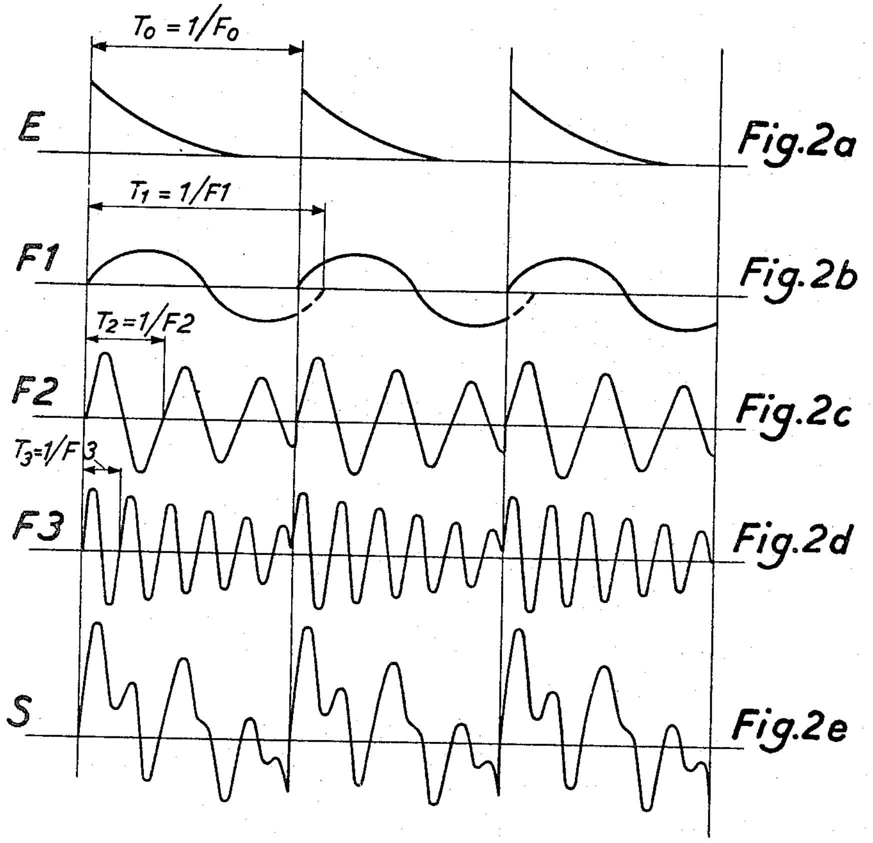

FIG. 1 is a block diagram which, by means of an electric analog, elucidates the transformation of the sound pulses generated by the vocal cords as a consequence of their passing through the resonance spaces of the mouth and of the throat. Reference character E designates an alternating voltage generator and characters F1, F2, F3 designate band pass filters having different natural frequencies. If the generator E generates the impulse like signals an output signal S will be obtained which has the shape indicated on the right side of the figure (see Fant, Acoustic Analysis and Synthesis of Speech With Application to Swedish, Ericsson Technics, Number 1, 1959). The resulting signal has thus a periodicity, corresponding to the voice fundamental, with a marked amplitude peak at the beginning of each voice fundamental period. This appears more clearly from FIGS. 2*a–2e*, where FIG. 2*a* shows the periodic pulses from the voice source, FIGS. 2*b–2d* show the time intervals of the first three formants F1, F2, F3 which may be represented by attenuated sinusoidal oscillations having their peak values at the beginning of each voice fundamental period and FIG. 2*e* shows the resulting signal S obtained by the superposition of the three formants and of a residue from the voice source.

Figure 3:
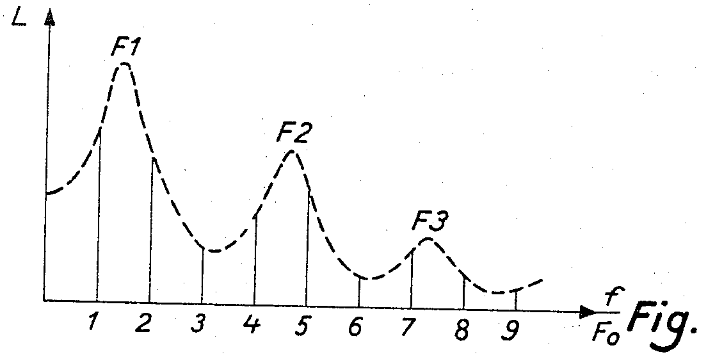
Figure 4A:
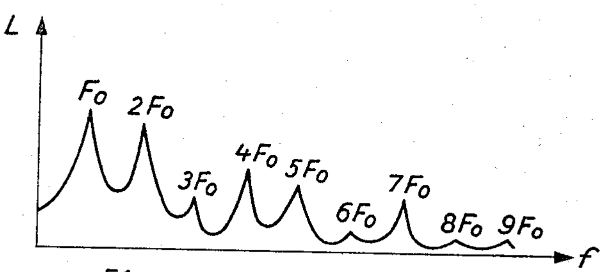
Figure 4B:
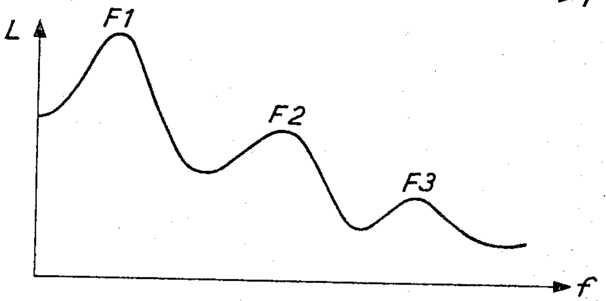
Figure 4C:
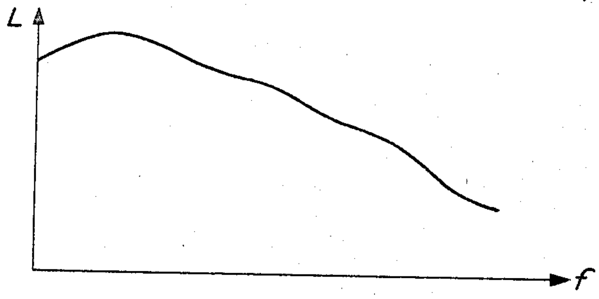

FIG. 3 shows diagrammatically a line spectrum with an envelope, the voice fundamental, the harmonics and the three formants F1, F2 and F3 being indicated. As is shown no formant coincides with a harmonic. If, for the spectrum measurement, too narrow band pass filters are used, the structure of the voice fundamental frequency $n \cdot Fo$ will appear instead of the formants as has been mentioned in the introduction and as is indicated in FIG. 4*a*. If on the other hand a too great filter width is selected, it is possible that two adjacent formants cannot be distinguished as is indicated in FIG. 4*c*. By selecting a suitable filter bandwidth it will however be possible to reproduce all formants as is indicated diagrammatically in FIG. 4*b*.

Figure 5:
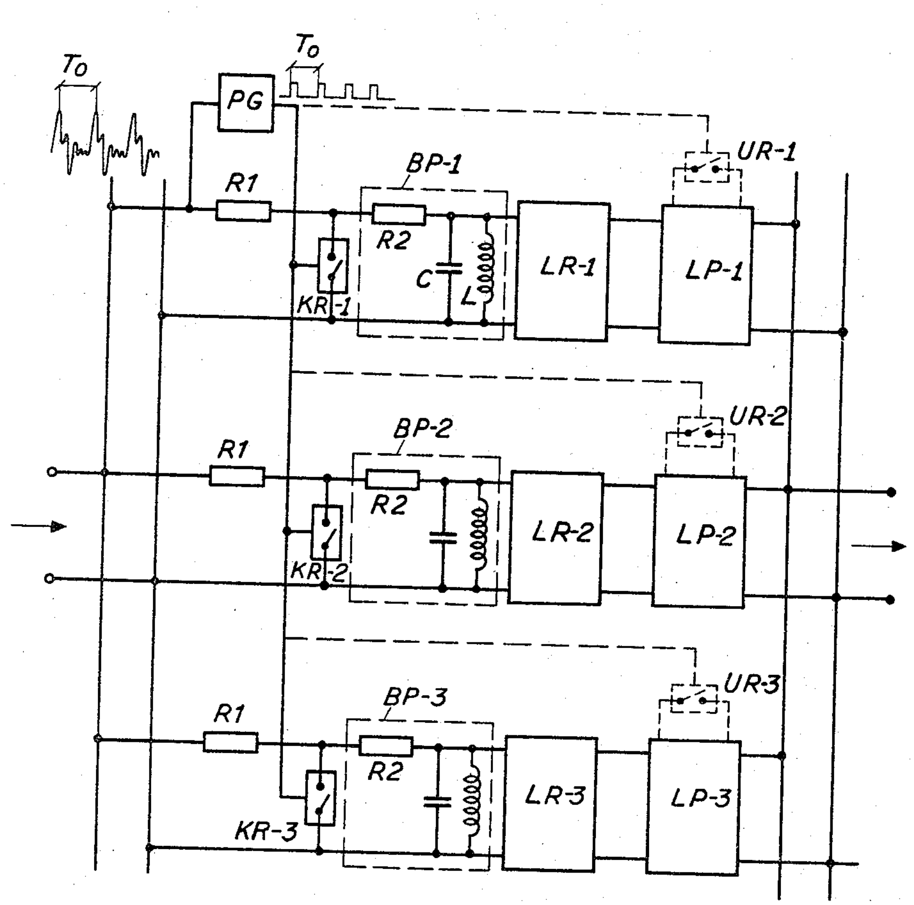
Figures 6, 7:
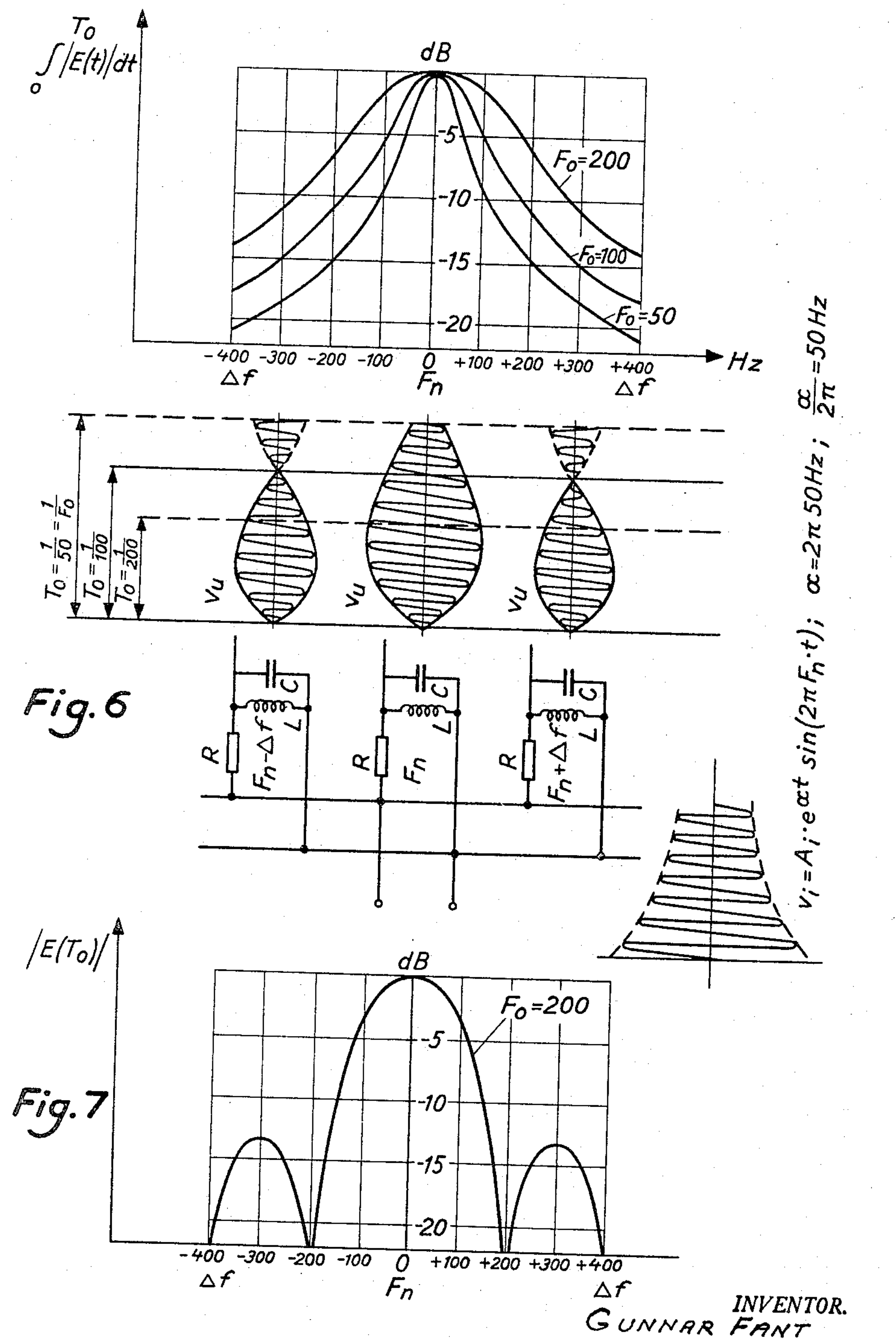

FIG. 5 shows a circuit arrangement according to the preferred embodiment of the invention which permits the relative band width of the band pass filter used in the analysis to be varied in dependence on the frequency of the voice fundamental. The incoming periodical speech wave is fed to a pulse generator PG which in synchronism with the period $1/Fo$ of the speech signal sends pulses to the three band pass filters BP1, BP2 and BP3. After each of these band pass filters are connected a rectifier LR1–3 and a subsequent low pass filter LP1–3 or another means for sensing of the signal and for a possible integration and storing of the signal in rectified form. According to the principle of the invention the stored energy of the band pass filters should be removed at the beginning of each voice fundamental period by a discharge whose time is short compared with the duration of the voice fundamental period. The discharge occurs by short-circuiting through switches KR which are controlled by the output signal from the pulse generator PG in step with the period of the speech wave. These switches are indicated only diagrammatically as make contacts but of course can consist of, for example, electronic switches or switches of any arbitrary type. The discharge occurs via a resistance R2 that produces a critical attenuation when the filter is discharged. The Q-value of the filters should be high.

As an alternative it is possible to remove the energy stored in the capacitors, by means of short-circuit contacts at the same ime as all coils are opened or, if the self capacity of the coil is of importance, are discharged through critically attenuating resistances. A further alternative is to include in the common input of the filter array, an interruption path which is controlled by pulse generatol PG. When frequency $Fo$ exceeds a definite value, every second voice fundamental period will be disconnected in order to prevent two adjacent voice fundamental periods from being added in opposite phase in the band pass filter. It should be emphasized that the manner in which the filter energy is conducted away, is selected in correspondence to the type of filter used, and is not essential from the point of view of the invention.

The rectifier unit such as rectifier LR–1 is permanently connected to the band pass filter BP–1 and the design of the rectifier unit has not either any importance from the point of view of the invention. The low pass filter LP–1 following the rectifier LR–1 may be a smoothing network of a design normally used in speech analysis or it may be arranged as an integrator which in the same way as the band pass filter is discharged once at the beginning of each voice fundamental period as indicated by means of dotted lines in FIG. 5 and will be explained in connection with FIG. 1. Alternatively its discharge is synchronized with a constant sampling frequency by means of a clock pulse which is common for the whole analysis system. The value sampled is either an average value for the period of time $1/F_0$, or another constant time period, or a momentary value of the envelope of the output voltage of the rectifier.

The theoretical basis of the invention appears from FIG. 6 which shows a filter group comprising a number of filters $F_n - \Delta f$ to $F_n + \Delta f$ connected in parallel. When periodically discharging each filter after each voice fundamental period $T_0 = 1/F_0$, the process will be described not by a Fourier series but by a Fourier integral. The Fourier integral represents a continuous spectrum and not a voice fundamental and harmonics, i.e. the harmonic structure is suppressed. It is possible to prove mathematically that if an attenuated sinusoidal oscillation is supplied to the input of the filter group $$v_i = A_i \cdot e^{-\alpha t} \sin \cdot \omega_n \cdot t$$

the voltage obtained in each of the filter outputs will be $$v_u=A_u\cdot t\cdot e^{-\alpha t}\cdot\frac{\sin\frac{\Delta\omega}{2}\cdot t}{\frac{\Delta\omega}{2}\cdot t}\cdot\sin\left(\frac{\omega_m+\omega_m}{2}\right)\cdot t$$

where the first term corresponds to the envelope $$E=A_u\cdot t\cdot e^{-\alpha t}\frac{\sin\frac{\Delta\omega}{2}t}{\frac{\Delta\omega}{2}\cdot t}$$

and the second term corresponds to a carrier wave. Furthermore, the format frequency $Fn=\omega_n/2\pi$, the centre-frequence F$m$ of the analysis channel$=\omega_m/2\pi$, and voice fundamental frequency $Fo=1/T_0$;

$$\omega_m^2=\frac{1}{L_m\cdot C_m}-\alpha^2$$

$$\Delta\omega=\omega_m-\omega_n;\ \alpha=\tfrac{1}{2}\cdot R_m\cdot C_m$$

If the envelope is integrated there will be obtained for each filter $$Y=\int_0^{T_o}E(t)dt=\frac{A_u}{\alpha^2+\frac{\Delta\omega^2}{4}}\left[e^{-\alpha T_o}\cdot\left(-\alpha\frac{\sin\frac{\Delta\omega}{2}T_o}{\frac{\Delta\omega}{2}}-\cos\frac{\Delta\omega}{2}\cdot T_o\right)+1\right]$$

which is a measure of the energy passing through a filter during a voice fundamental period, more exactly defined as a rectified average value of the signal. The sharpness of analysis of the filter group is thus represented by the curves in FIG. 6 which indicate the energy passed by the filter group for applied sinusoidal voltages of different frequencies. It appears that the sharpness of the analysis will be dependent on the time of integration which according to the above is determined by the voice fundamental frequency. The band width of the analyzer will consequently be dependent on the voice fundamental frequency and thus the goal that the active filter band width will be adapted to the voice fundamental frequency and will no longer be dependent on the band width of the individual filters is attained.

When the arrangement works according to the above mentioned principle an LP-filter or an integrator stores an average value or a sum energy value during a time which is greater than or equal to the duration of the voice fundamental period. Such an average value indicated in a frequency curve on the basis of the separate analysis channels does not show any consipicuous detailed structure having the frequency interspace of the voice fundamental. The curve of selectively is substantially even, having a peak at the frequency of the formant. The shape and the relative steepness of the flanks of the curve are not in a simple relation to the frequency curve of the band pass filter but the effective band width is proportional to the voice fundamental frequency, i.e. is conversely proportional to the length of the measuring range corresponding to the law of reciprocal spreading.

An alternate solution is to make use of the voltage obtained from the output of the rectifier wherein the rectified voltage is smoothed with a very small time constant. This voltage is sensed momentarily by the pulses coming from the pulse generator and transmitted to a memory circuit once for each voice fundamental frequency period. Such a measuring value is an approximation to the Fourier integral of the preceding voice fundamental frequency period. When, assuming that the speech wave within a period of the voice fundamental frequency is an attenuated sinusoid which would correspond to the condition that the frequency range which is covered by the analysis channels of the group, comprises a single formant, the frequency curve composed of synchronously sensed values from the different analysis channels shows a maximum value at the frequency of the formant and on both sides of said maximum value shows minimum values at a distance corresponding to multiples of the fundamental frequency $Fo=1/To$. This corresponds to the factor $\sin x/x$ in the spectrum of the Fourier integral of a sinusoidal shaped sound having a definite number of periods and the duration $To$. It is true that the harmonical structure of the fundamental frequency appears in a representation of this type but the advantage is obtained that the highest peak in frequency functioin really represents the formant, contrary to what is the case in a usual Fourier series in which the formant does not necessarily coincide with a partial tone. This type of filter characteristic is shown diagrammatically in FIG. 7 which is based on the same presuppositions as for FIG. 6, i.e. that the band width of the filter $\alpha/2\pi$ is equal to the band width of the formants, being normally 50 Hz. It is not critical how the band width values of the individual resonance circuits are selected as long as they are less than 100 Hz. The band width at 0 Hz. corresponds to the condition when the filter equipment has been replaced by means for correlation of incoming speech signals with pure sinusoidal signals and gives a somewhat better selectivity than the band width of 50 Hz.

In FIG. 7 the 3 db limits are situated near the frequencies $\pm F_0/2$ while the usual techniques of analysis necessitate filters of a width greater than frequencies $\pm F_0$. By the method according to the invention two advantages are obtained. The sharpness of the analysis is automatically adapted to frequency $F_0$ furthermore the sharpness will be somewhat better than for a conventional system having filters adapted to a specific $F_0$-value. It should also be noticed that energy distribution diagrams according to FIG. 6 or 7 give a greater certainty in the definition of the formant frequency at a high $F_0$ frequency value than a Fourier series as the frequency intervals in the sampling are limited only by the fact as to how closely the analysis channels are situated and not by the fundamental frequency $F_0$ as in a harmonic series.

I claim:

1. Apparatus used in the spectrum analysis of speech signals for emphasizing the formants in the envelope of a speech spectrum which includes a voice fundamental frequency comprising an input means for receiving the speech signals; a plurality of band pass filters connected in parallel to said input means, each of said band pass filters including at least one signal energy storing means; controllably operable means for simultaneously discharging each of said signal energy storing means; and control means connected to said input means and controlled by the voice fundamental frequency to operate said controllable operable means at the start of each voice fundamental frequency period for a length of time which is short with respect to said voice fundamental frequency period so that the signal energy stored in said signal energy storing means during the preceding voice fundamental period is discharged.

2. The apparatus of claim 1 wherein said controllably operable means comprises a plurality of pulse operable switch means, each connected in parallel with one of said signal energy storing means, and said control means is a pulse generator which transmits control pulses to each of said pulse operable switch means.

3. The apparatus of claim 2 further comprising a plurality of signal rectifier means, each of said signal rectifier means being connected to one of said band pass filters, respectively.

4. The apparatus of claim 3 further comprising a plurality of low pass filter means, each of said low pass filter means being connected to one of said rectifier means respectively.

5. The apparatus of claim 4 wherein each of said low pass filter means includes a second signal energy storing means and further comprising a plurality of second pulse operable switch means, each connected to one of said low pass filter means for discharging signal energy stored by the second signal energy storing means thereof, and means for connecting each of said second pulse operable switch means to said pulse generator.

References Cited

UNITED STATES PATENTS

| | | | |
|---|---|---|---|
| 3,335,225 | 8/1967 | Campanella et al. ------ | 179—1 |
| 3,078,345 | 2/1963 | Campanella et al. ------ | 179—1 |

WILLIAM C. COOPER, *Primary Examiner.*

KATHLEEN H. CLAFFY, *Examiner.*

R. MURRAY, R. P. TAYLOR, *Assistant Examiners.*